United States Patent
Oyanagi et al.

(10) Patent No.: US 7,569,623 B2
(45) Date of Patent: Aug. 4, 2009

(54) INK COMPOSITION

(75) Inventors: Takashi Oyanagi, Nagano (JP); Keitaro Nakano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 501 days.

(21) Appl. No.: 11/183,320

(22) Filed: Jul. 15, 2005

(65) Prior Publication Data

US 2006/0036001 A1 Feb. 16, 2006

(30) Foreign Application Priority Data

Jul. 20, 2004 (JP) .......................... P.2004-211333

(51) Int. Cl.
*C09D 11/00* (2006.01)
(52) U.S. Cl. ...................... 523/160; 523/161
(58) Field of Classification Search ................ 523/160, 523/161
See application file for complete search history.

(56) References Cited

U.S. PATENT DOCUMENTS

| 5,623,001 | A | 4/1997 | Figov |
| 6,467,897 | B1 | 10/2002 | Wu et al. |
| 2004/0259976 | A1* | 12/2004 | Akiyama et al. ............ 523/160 |

FOREIGN PATENT DOCUMENTS

| CN | 1486353 | 3/2004 |
| JP | 03-216379 | 9/1991 |

OTHER PUBLICATIONS

Patent Abstract of Japan of JP 03-216379 dated Sep. 24, 1991.

* cited by examiner

*Primary Examiner*—Edward J Cain
(74) *Attorney, Agent, or Firm*—Ladas and Parry LLP

(57) ABSTRACT

The present invention provides an ink composition comprising fine particles having a polymerizable functional group.

13 Claims, No Drawings

INK COMPOSITION

FIELD OF THE INVENTION

The present invention relates to an ink composition and, particularly, relates to an ultraviolet curing ink composition which is curable with an ultraviolet ray, high in its curing (polymerization) rate, low in viscosity and low in toxicity.

BACKGROUND OF THE INVENTION

An ink jet recording method is a printing method of ejecting droplets of an ink composition and attaching them to a recording medium such as paper, thereby performing printing. This ink jet recording method is characterized by that images having high resolution and high quality can be printed at high speed. The ink composition used in the ink jet recording method is generally one mainly comprising an aqueous solvent and containing a coloring material component and a wetting agent such as glycerin for the purpose of preventing clogging.

When printing is performed on paper or cloth of a type that is hard for the aqueous ink composition to penetrate thereinto, or a material such as metal or plastic into which the aqueous ink composition does not penetrate, for example, a recording medium such as a plate or a film made of a resin such as a phenol resin, a melamine resin, a vinyl chloride resin, an acrylic resin or a polycarbonate resin, the ink composition is required to contain a component which can allow the coloring material to be stably fixed to the recording medium. In particular, when printing is performed on a printed-circuit board, a color filter of a liquid-crystal display, or the like, quick drying properties and chemical resistance are demanded for the ink composition.

To such a demand, an ink composition comprising a component polymerizable by ultraviolet irradiation has hitherto been proposed (see, for example, patent document 1). Further, an ultraviolet curing ink composition comprising a coloring material, an ultraviolet curing agent, photopolymerization initiator and the like has been proposed (see, for example, patent document 2). It is disclosed that according to these ink compositions and ink jet recording methods, blurring of the ink composition on the recording medium can be prevented to improve image quality.

In the ink jet recording method using the ink composition comprising the component polymerizable by ultraviolet irradiation as described above, an ultraviolet lay is irradiated after the ink composition has been attached to the recording medium. Thereupon, the photopolymerization initiator in the ink composition forms radicals, thereby initiating polymerization of an oligomer and a monomer to cause curing. Accordingly, the coloring material in the ink composition is firmly fixed onto the recording medium. It is considered that this firm fixing enables to realize printing which is high in film strength, solvent resistance and color density and has decreased blurring and unevenness.

It has been known that monomers used in the conventional ultraviolet curing inks generally have the tendency that one having high curability is high in the primary irritation index (PII), whereas one having low PII is low also in curability. In the conventional ultraviolet curing ink compositions, materials having a PII of 5 or more are used as raw materials in many cases in order to enhance the rate of polymerization, and attention is required for handling thereof. An equipment burden such as the use of a local exhaust system is necessary upon use, and this has not been favorable.

Further, the rate of polymerization by ultraviolet curing generally tends to increase as the molecular weight of a monomer used decreases.

From the relationship between the high and low of the above-mentioned PII and the high and low of curability (rate) and the relationship between the high and low of the rate of ultraviolet curing polymerization and the high and low of the molecular weight of the monomer used, (in the case of similar structures), the lower the molecular weight of the monomer used is, the higher the rate of polymerization is, but also the higher the PII is. The higher the molecular weight of the monomer used is, the lower the PII is, but also the lower the rate of polymerization is, and further, the viscosity also becomes high (for example, in order to decrease the PII, a methacrylate monomer is more effective than an acrylate monomer, but it decreases the rate of polymerization and raises the viscosity).

Furthermore, it is also advantageous to use a multifunctional monomer as a measure for decreasing the PII and enhancing the rate of polymerization, but it raises the viscosity.

In order to decrease the viscosity of a high-viscosity ink composition, it is forced to use an organic solvent (VOC) which is high in volatility (evaporates at ordinary temperature) in a large amount. This has not been favorable also from the viewpoint of the environment.

Patent Document 1: JP 3-216379 A
Patent Document 2: U.S. Pat. No. 5,623,001

As described above, various attempts have been made to the demands of decreasing the PII, enhancing the rate of polymerization and decreasing the viscosity. However, the development of an ink composition which meets all the high rate of polymerization, low PII value and low viscosity has not been achieved.

SUMMARY OF THE INVENTION

The invention has been made in order to solve the above-mentioned problems.

Accordingly, an object of the invention is to provide an ultraviolet curing ink composition which is high in the rate of curing (polymerization), low in viscosity and low in toxicity.

Other objects and effects of the invention will become apparent from the following description.

The present inventors have made extensive studies. As a result, the above-mentioned objects have been achieved by providing the ink compositions shown below, thus completing the invention.

That is, the invention relates to:

(1) An ink composition comprising fine particles having a polymerizable functional group;

(2) The ink composition of the above (1), wherein the fine particles are an inorganic compound;

(3) The ink composition of the above (1) or (2), wherein the fine particles are transparent; and (4) The ink composition of the above (1), wherein the polymerizable functional group has at least one double bonds.

The ink composition of the invention comprises fine particles having a polymerizable functional group, thereby being able to meet the high rate of polymerization, low PII value and low viscosity. Further, this eliminates the necessity of the use of a diluent solvent for decreasing the viscosity.

Although the effect-arising mechanism of the invention is not clear, it is presumed as follows. The polymerizable functional group-containing fine particles are contained in the ink composition of the invention, whereby a monomer component is adsorbed by surfaces of the fine particles, resulting in no escape of radicals generated by a polymerization initiator. Therefore, the monomer adsorbed by the surfaces of the fine particles efficiently contributes to polymerization. That is, it is presumed that the fine particles having a polymerizable functional group act as a polymerizable curing accelerator.

DETAILED DESCRIPTION OF THE INVENTION

The ink composition of the invention will be described in detail below.

The polymerizable functional group-containing fine particles contained in the ink composition of the invention are not particularly limited, as long as they provide the effect of the invention, and those called extender pigments are generally used. Examples thereof include inorganic compounds such as silica, alumina, titania and calcium oxide, and particularly, transparent ones such as silica and alumina can be suitably used.

Further, although the polymerizable functional group contained in the fine particles is not particularly limited, examples thereof include an acryloyl group and a methacryloyl group. It is also possible to use a polymerizable functional group having one or more double bonds.

Although there is no particular limitation on the size of the fine particles, the particle size is preferably from 10 to 100 nm.

Although a method for preparing the polymerizable functional group-containing fine particles is not particularly limited, examples thereof include a method of preparing fine silane-based particles having a large number of hydroxyl groups, etc. by a sol-gel reaction of a silane compound such as a silanol, and allowing them to react with a compound which can impart polymerizable functional groups to the hydroxyl groups.

The content of the polymerizable functional group-containing fine particles in the ink composition of the invention is not particularly limited, and should be appropriately selected depending on the type of use mode, conditions, the intended relationship between the viscosity of the ink composition and polymerizability. However, it is preferably 10% by weight or less based on the total amount of the ink composition.

Components other than the polymerizable functional group-containing fine particles in the ink composition of the invention are mainly a monomer and a photopolymerization initiator.

As the monomers, any of a monofunctional monomer, a bifunctional monomer and a trifunctional or higher functional monomer may be used. However, it is preferred that all monomers have a PII value of 2 or less.

Further, from the viewpoint of decreasing the viscosity of the ink composition, the amount of the bifunctional monomer and multifunctional monomer used is preferably as small as possible.

The monofunctional monomers, bifunctional monomers and multifunctional monomers having a PII value of 2 or less, which can be used in the ink composition of the invention, are listed in Table 1 below.

TABLE 1

| Material Name | Viscosity (mPa·s) | P.I.I. |
|---|---|---|
| Monofunctional Monomer | | |
| (2-Methyl-2-ethyl-1,3-dioxolane-4-yl)methyl acrylate (MEDOL-10, manufactured by Osaka Organic Chemical Industry Ltd.) | 5.1 | 1.3 |
| (2-Methyl-2-isobutyl-1,3-dioxolane-4-yl)methyl acrylate (MIBDOL-10, manufactured by Osaka Organic Chemical Industry Ltd.) | 5.3 | 1.0 |
| Phenoxyethyl acrylate (Viscoat #192, manufactured by Osaka Organic Chemical Industry Ltd.) | 3.3 | 1.7 |
| Isobonyl acrylate (IBXA, manufactured by Osaka Organic Chemical Industry Ltd.) | 2.6 | 0.6 |
| N-Vinylformamide (Beamset 770, manufactured by Arakawa Chemical Industries Ltd.) | 4.3 | 0.4 |
| Methoxydiethylene glycol monoacrylate (Blenmer PME-100, manufactured by NOF Corporation) | 2 | 0.7 |
| Bifunctional Monomer | | |
| Ethylene glycol dimethacrylate (Light Ester EG, manufactured by Kyoeisha Chemical Co., Ltd) | 3 | 0.6 |
| Diethylene glycol dimethacrylate (Light Ester 2EG, manufactured by Kyoeisha Chemical Co., Ltd) | 5 | 0.5 |
| Tripropylene glycol diacrylate (Aronix M-220, manufactured by Toagosei Co., Ltd) | 12 | 1.6 |
| 1,9-Nonanediol diacrylate (Viscoat #260, manufactured by Osaka Organic Chemical Industry Ltd.) | 21 | 2.0 |
| Polyethylene glycol #400 diacrylate (NK Ester A400, manufactured by Shin-Nakamura Chemical Co., Ltd.) | 58 | 0.4 |
| Tetraethylene glycol dimethacrylate (NK Ester 4G, manufactured by Shin-Nakamura Chemical Co., Ltd.) | 14 | 0.5 |
| 1,6-Hexanediol dimethacrylate (NK Ester HD-N, manufactured by Shin-Nakamura Chemical Co., Ltd.) | 6 | 0.5 |
| Neopentyl glycol dimethacrylate (NK Ester NPG, manufactured by Shin-Nakamura Chemical Co., Ltd.) | 7 | 0.0 |
| 2-Hydroxy-1,3-dimethacryloxypropane (NK Ester 701, manufactured by Shin-Nakamura Chemical Co., Ltd.) | 37 | 0.6 |
| Multifunctional Monomer | | |
| Trimethylolpropane trimethacrylate (NK Ester TMPT, manufactured by Shin-Nakamura Chemical Co., Ltd.) | 42 | 0.8 |
| Trimethylolpropane EO adduct triacrylate (Viscoat #360, manufactured by Osaka Organic Chemical Industry Ltd.) | 55 | 1.5 |
| Trimethylolpropane PO adduct triacrylate (New Frontier TMP-3P, Manufactured by Dai-Ichi Kogyo Seiyaku Co., Ltd.) | 60 | 0.1 |
| Glycerin PO adduct triacrylate (Viscoat #GPT, manufactured by Osaka Organic Chemical Industry Ltd.) | 75 | 0.8 |

The viscosity values shown in the above-mentioned table are measured values at 25° C.

The photopolymerization initiator for use in the ink composition of the invention is, for example, one which absorbs a ultraviolet ray in the region of about 250 nm to 450 nm to form radicals or ions, thereby initiating polymerization of the above-mentioned monomer.

Typical examples of the photopolymerization initiators used in the invention include benzoin methyl ether, benzoin ethyl ether, isopropyl benzoin ether, isobutyl benzoin ether, 1-phenyl-1,2-propanedione-2-(o-ethoxycarbonyl)oxime, benzil, diethoxyaceto-phenone, benzophenone, chlorothioxantone, 2-chlorothioxantone, isopropylthioxantone, 2-methylthioxantone, polychlorinated polyphenyl and hexachlorobenzene, and preferred are isobutyl benzoin ether and 1-phenyl-1,2-propanedione-2-(o-ethoxycarbonyl)oxime.

Further, there can also be used photopolymerization initiators available under the trade names of Vicure 10 and 30 (manufactured by Stauffer Chemical), Irgacure 184, 651, 2959, 907, 369, 1700, 1800, 1850 and 819 (manufactured by Ciba Specialty Chemicals), Darocure 1173 (manufactured by EM Chemical), Quantacure CTX and ITX (manufactured by Aceto Chemical) and Lucrin TPO (manufactured by BASF).

Furthermore, the ink composition of the invention may contain an oligomer as a polymerizable compound, in addition to the above-mentioned monomers.

The oligomer which can be used in the ink composition of the invention means a molecule having a medium-sized relative molecular mass and having a structure constituted by few repetitions, generally about 2 to 20 repetitions, of a unit substantially or conceptually obtained from a molecule having a small relative molecular mass. Further, the oligomer for use in the invention includes one called a photopolymerizable prepolymer, base resin or an acrylic oligomer.

The oligomer has one to several polymerizable functional groups, so that it has the property of inducing a polymerization reaction with the monomer, etc. to cause crosslinking and polymerization. Preferred examples of the polymerizable functional group include an acryloyl group.

Examples of the oligomer for use in the invention include a polyester acrylate, a polyurethane acrylate, an epoxy acrylate, a polyether acrylate, an oligo acrylate, an alkyd acrylate and a polyol acrylate, and preferred are a polyester acrylate and a polyurethane acrylate.

The oligomer for use in the invention has a molecular weight ranging from about 500 to 20,000, preferably from about 5,000 to 10,000.

When the ink composition of the invention is used as a transparent ink, transparent fine particles are used as the above-mentioned polymerizable functional group-containing fine particles, and the ink composition is prepared without the addition of a coloring agent (also briefly referred to as a colorant).

When the ink composition of the invention is used as a colored ink, transparent or white fine particles are used as the above-mentioned polymerizable functional group-containing fine particles, and a necessary colorant is added.

The colorant to be used in this case may be either a dye or a pigment. However, when the penetration of the coloring component in the ink composition is inhibited by the insolubilization of the ink composition or an action such as thickening, a pigment dispersed in the ink is advantageous rather than a dye dissolved therein.

As the dyes, there can be used various dyes which are generally used for ink jet recording, such as a direct dye, an acid dye, a food dye, a basic dye, a reactive dye, a disperse dye, a vat dye, a soluble vat dye and a reactive disperse dye.

As the pigments, inorganic pigments and organic pigments can be used without particular limitation.

As the inorganic pigments, there can be used carbon blacks produced by known processes such as a contact process, a furnace process and a thermal process, as well as titanium oxide and iron oxide. Further, as the organic pigments, there can be used azo pigments (including an azo lake, an insoluble azo pigment, a condensed azo pigment and a chelate azo pigment), polycyclic pigments (for example, a phthalocyanine pigment, a perylene pigment, a perynone pigment, an anthraquinone pigment, a quinacridone pigment, a dioxazine pigment, a thioindigo pigment, an isoindolinone pigment and a quinophthalone pigment), dye chelates (for example, a basic dye type chelate and acid dye type chelate), nitro pigments, nitroso pigments and aniline black.

As another component, a polymerization inhibitor can be added in an amount of 200 to 2,000 ppm, in order to enhance the storage stability of the ink composition. Since the ultraviolet curing ink composition is preferably ejected while its viscosity is decreased by heating, the polymerization inhibitor is preferably added also in order to prevent head clogging due to thermal polymerization.

In addition to this, a surfactant, a leveling additive, a matte agent, and a polyester resin, a polyurethane resin, a vinyl resin, an acrylic resin, a rubber resin or a wax for adjusting film properties can be added as needed. In order to improve adhesion with a recording medium, it is also effective to add a very slight amount of an organic solvent. In this case, it is effective to add the solvent within the range in which no problem arises for solvent resistance and VOC, and the amount thereof is from 0.1 to 5%, and preferably from 0.1 to 3%.

Further, as a means for preventing a decrease in sensitivity because of a light shielding effect caused by the ink colorant, it is also possible to combine a cationic polymerizable monomer having a long initiator life with the initiator to prepare a radical-cation hybrid type curing ink.

Furthermore, the viscosity of the ink composition of the invention is preferably 100 mPa·s or less at 25° C. for use.

The ink composition of the invention can be applied to all known conventional image recording and printing methods. For example, it can be applied to the image recording and printing methods such as an ink jet method, an offset method, a gravure method and a thermal transfer method. In particular, the ink composition of the invention is suitable for ink jet recording.

In the ink jet recording method using the ink composition of the invention, the ink composition is attached to a recording medium, and then, irradiated with ultraviolet light. The photopolymerization initiator generates radicals by the irradiated ultraviolet light, whereby the monomer (also the oligomer, when the oligomer is present) starts the polymerization reaction, and the ink composition is firmly fixed to the recording medium. It is considered that clear printing excellent in film strength and chemical resistance can be performed thereby also on a surface of a material such as metal or plastic into which an aqueous medium is impossible to penetrate.

According to a preferred embodiment of the invention, when ultraviolet irradiation is performed, the ultraviolet dose is from 100 mJ/cm$^2$ or higher, preferably 500 mJ/cm$^2$ or higher, and also is 10,000 mJ/cm$^2$ or lower, preferably 5,000 mJ/cm$^2$ or lower. The ultraviolet dose within such a range is advantageous, because it can achieve a sufficient curing reaction, and prevent fading of the coloring agent caused by ultraviolet irradiation.

Light sources for ultraviolet irradiation include lamps such as a metal halide lamp, a xenon lamp, a carbon arc lamp, a chemical lamp, a low-pressure mercury lamp and a high-pressure mercury lamp. For example, commercially available lamps such as H Lamp, D Lamp and V Lamp manufactured by Fusion System can be used.

Further, ultraviolet irradiation can be performed with an ultraviolet light emitting semiconductor element such as an ultraviolet light emitting diode (ultraviolet LED) or an ultraviolet light emitting semiconductor laser.

Furthermore, in an ink jet recording method using the ink composition of the invention, heating may be performed concurrently with or after ultraviolet light irradiation.

Heating methods include a method of heating by bringing a heat source in contact with the recording medium and a method of heating without contact with the recording medium, for example, by irradiating an infrared ray or a microwave (an electromagnetic wave having the maximum wavelength at about 2,450 Mhz) or by blowing hot air.

EXAMPLES

The present invention will be illustrated in greater detail with reference to the following examples, but the invention should not be construed as being limited thereto.

1. Method for Producing Polymerizable Fine Particles

To a conical flask having a volume of 200 ml, 88.1 parts by weight of Silica Sol IPA-ST (manufactured by Nissan Chemical Industries, Ltd., an isopropyl alcohol (hereinafter abbreviated as IPA) dispersion having a silica concentration of 30% by weight) was added, and 7.9 parts by weight of a silane compound, Sila-Ace S710 (manufactured by Chisso Corporation), was added thereto. Then, a 0.05-mol/liter hydrochloric acid was added in an amount of 4 parts by weight with stirring with a magnetic stirrer, and reaction was conducted with stirring at room temperature for 24 hours. As a result, IPA dispersion A containing polymerizable fine particles 1 was obtained.

2. Preparation of Ink Compositions

Example 1

(1) Preparation of Ink Composition 1

To a round flask having a volume of 800 ml, 70 parts by weight of Medol-10 and 100 parts by weight of the above-mentioned dispersion A were added, and IPA was removed by distillation using a rotary evaporator to obtain monomer solution B containing 30% by weight of polymerizable fine particles 1.

To a brown sample vial having a volume of 100 ml, 20 g of this monomer solution B was added, and 61 g of Medol-10, 14 g of Viscoat #360 and 5 g of Irgacure 1800 were added thereto, followed by stirring with a magnetic stirrer for 1 hour to obtain transparent ink composition 1. The composition and viscosity of this ink composition 1 are as shown below.

Example 2

(2) Preparation of Ink Composition 2

To a brown sample vial having a volume of 100 ml, 33.3 g of this monomer solution B was added, and 51.7 g of Medol-10, 10 g of Viscoat #360 and 5 g of Irgacure 1800 were added thereto, followed by stirring with a magnetic stirrer for 1 hour to obtain transparent ink composition 2. The composition and viscosity of this ink composition 2 are as shown below.

Comparative Example 1

(3) Preparation of Ink Composition 3

To a brown sample vial having a volume of 100 ml, 75 g of Medol-10, 20 g of Viscoat #360 and 5 g of Irgacure 1800 were added, followed by stirring with a magnetic stirrer for 1 hour to obtain transparent ink composition 3. The composition and viscosity of this ink composition 3 are as shown below.

Comparative Example 2

(4) Preparation of Ink Composition 4

To a round flask having a volume of 800 ml, 70 parts by weight of Medol-10 and 100 parts by weight of the above-mentioned Silica Sol IPA-ST were added, and IPA was removed by distillation using a rotary evaporator to obtain monomer solution C containing 30% by weight of fine silica particles having no polymerizable functional group.

To a brown sample vial having a volume of 100 ml, 20 g of this monomer solution C was added, and 61 g of Medol-10, 14 g of Viscoat #360 and 5 g of Irgacure 1800 were added thereto, followed by stirring with a magnetic stirrer for 1 hour to obtain transparent ink composition 4. The composition and viscosity of this ink composition 4 are as shown below.

Example 1

Transparent Ink Composition 1

| | |
|---|---|
| Medol-10 (manufactured by Osaka Organic Chemical Industry Ltd.) | 75 parts by weight |
| Viscoat #360 (manufactured by Osaka Organic Chemical Industry Ltd.) | 14 parts by weight |
| Irgacure 1800 (manufactured by Ciba Specialty Chemicals Corp.) | 5 parts by weight |
| Polymerizable fine particles 1 | 6 parts by weight |
| Viscosity | 11.5 (mPa·s) |

Example 2

Transparent Ink Composition 2

| | |
|---|---|
| Medol-10 (manufactured by Osaka Organic Chemical Industry Ltd.) | 75 parts by weight |
| Viscoat #360 (manufactured by Osaka Organic Chemical Industry Ltd.) | 10 parts by weight |
| Irgacure 1800 (manufactured by Ciba Specialty Chemicals Corp.) | 5 parts by weight |
| Polymerizable fine particles 1 | 10 parts by weight |
| Viscosity | 12.0 (mPa·s) |

Comparative Example 1

Transparent Ink Composition 3

| | |
|---|---|
| Medol-10 (manufactured by Osaka Organic Chemical Industry Ltd.) | 75 parts by weight |
| Viscoat #360 (manufactured by Osaka Organic Chemical Industry Ltd.) | 20 parts by weight |
| Irgacure 1800 (manufactured by Ciba Specialty Chemicals Corp.) | 5 parts by weight |
| Viscosity | 11.0 (mPa·s) |

Comparative Example 2

Transparent Ink Composition 4

| | |
|---|---|
| Medol-10 (manufactured by Osaka Organic Chemical Industry Ltd.) | 75 parts by weight |
| Viscoat #360 (manufactured by Osaka Organic Chemical Industry Ltd.) | 14 parts by weight |

-continued

| | |
|---|---|
| Irgacure 1800 (manufactured by Ciba Specialty Chemicals Corp.) | 5 parts by weight |
| Fine silica particles 2 | 6 parts by weight |
| Viscosity | 11.7 (mPa · s) |

3. Curing Experiment

The above-mentioned composition was dropped onto a glass plate, and treated under conditions of an ultraviolet wavelength of 365 nm, an irradiation intensity of 17 mW/cm$^2$, an irradiation time of 6 seconds and an integrated light volume of 102 mJ/cm$^2$. Then, evaluation was made visually according to the following criteria. Evaluation criteria:

A: completely cured.
B: almost cured, but incomplete.
C: only partially cured.

4. Pencil Hardness Test

As for the sample cured by the above-mentioned method, hardness was evaluated by a method specified in JIS K5400 (a pencil scratch test, a handwriting method).

The results of the hardness experiment and pencil hardness test are shown in Table 2.

TABLE 2

| | Curing Test | Pencil Hardness Test |
|---|---|---|
| Example 1 | A | 2H |
| Example 2 | A | 2H |
| Comparative Example 1 | B | — |
| Comparative Example 2 | B | B |

5. Print Test

Utilizing an ink jet printer, PM-G900, manufactured by Seiko Epson Corporation, solid pattern printing was performed at ordinary temperature and ordinary pressure using the ink compositions of the above-mentioned examples and an OHP film (manufactured by Fuji Xerox Co., Ltd., XEROX FILM <unframed>), and printing and curing treatment were performed at the same time by means of an ultraviolet irradiation equipment installed at a delivery port under such curing conditions as to give an integrated light amount of 90 mJ/cm$^2$. Also in this case, similarly, the curability was visually evaluated. The results thereof are shown in the following Table 3.

TABLE 3

| | Curability Test |
|---|---|
| Example 1 | A |
| Example 2 | A |
| Comparative Example 1 | C |
| Comparative Example 2 | C |

In Examples 1 and 2, each ultraviolet curing ink composition was cured on the OHP film in a thin film form. However, in Comparative Examples 1 and 2, each composition was only partially cured, resulting in a portion remained uncured.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2004-211333 filed Jul. 20, 2004, the content thereof being herein incorporated by reference.

What is claimed is:

1. An ink composition comprising fine particles having a polymerizable functional group, said fine particles comprising less than 10% by weight of the ink composition, wherein the fine particles are transparent.

2. The ink composition according to claim 1, wherein the fine particles are an inorganic compound.

3. The ink composition according to claim 1, wherein the polymerizable functional group has at least one double bond.

4. An ink composition comprising fine particles having a polymerizable functional group, said fine particles comprising less than 10% by weight of the ink composition, wherein the fine particles are an inorganic compound, and wherein the fine particles are transparent.

5. The ink composition according to claim 1, wherein the ink composition further comprises monomers and a photopolymerization initiator.

6. The ink composition according to claim 5, wherein the monomers are selected from the group consisting of monofunctional monomers, bifunctional monomers and multifunctional monomers having a primary irritation index (PII) value of 2 or less.

7. The ink composition according to claim 5, wherein the fine particles, the monomers and the photopolymerization initiator are present in the ink composition such that, when the composition is dropped onto a glass plate and treated under conditions of an ultraviolet wavelength of 365 nm, an irradiation intensity of 17 mW/cm$^2$, an irradiation time of 6 seconds and an integrated light volume of 102 mJ/cm$^2$, the composition is completely cured and has a hardness of 2H as evaluated by the method specified in JIS K5400.

8. The ink composition according to claim 2, wherein the ink composition further comprises monomers and a photopolymerization initiator.

9. The ink composition according to claim 8, wherein the monomers are selected from the group consisting of monofunctional monomers, bifunctional monomers and multifunctional monomers having a primary irritation index (PII) value of 2 or less.

10. The ink composition according to claim 8, wherein the fine particles, the monomers and the photopolymerization initiator are present in the ink composition such that, when the composition is dropped onto a glass plate and treated under conditions of an ultraviolet wavelength of 365 nm, an irradiation intensity of 17 mW/cm$^2$, an irradiation time of 6 seconds and an integrated light volume of 102 mJ/cm$^2$, the composition is completely cured and has a hardness of 2 H as evaluated by the method specified in JIS K5400.

11. An ink composition comprising fine particles having a polymerizable functional group, said fine particles comprising less than 10% by weight of the ink composition, wherein the fine particles are transparent, and wherein the ink composition further comprises monomers and a photopolymerization initiator.

12. The ink composition according to claim 11, wherein the monomers are selected from the group consisting of monofunctional monomers, bifunctional monomers and multifunctional monomers having a primary irritation index (PII) value of 2 or less.

13. The ink composition according to claim 11, wherein the fine particles, the monomers and the photopolymerization initiator are present in the ink composition such that, when the composition is dropped onto a glass plate and treated under conditions of an ultraviolet wavelength of 365 nm, an irradiation intensity of 17 mW/cm², an irradiation time of 6 seconds and an integrated light volume of 102 mJ/cm², the composition is completely cured and has a hardness of 2 H as evaluated by the method specified in JIS K5400.

* * * * *